(12) United States Patent
Hansen et al.

(10) Patent No.: US 9,356,673 B2
(45) Date of Patent: May 31, 2016

(54) COMMUNICATION DEVICE INCORPORATING BEAMFORMING HANDSHAKING

(75) Inventors: Christopher J. Hansen, Sunnyvale, CA (US); Jason A. Trachewsky, Menlo Park, CA (US)

(73) Assignee: BROADCOM CORPORATION, Irvine, CA (US)

( * ) Notice: Subject to any disclaimer, the term of this patent is extended or adjusted under 35 U.S.C. 154(b) by 1475 days.

(21) Appl. No.: 12/575,727

(22) Filed: Oct. 8, 2009

(65) Prior Publication Data

US 2010/0150254 A1 Jun. 17, 2010

Related U.S. Application Data

(60) Provisional application No. 61/138,519, filed on Dec. 17, 2008.

(51) Int. Cl.
*H04B 7/06* (2006.01)
*H04B 7/08* (2006.01)

(52) U.S. Cl.
CPC ............ *H04B 7/0617* (2013.01); *H04B 7/0619* (2013.01); *H04B 7/086* (2013.01)

(58) Field of Classification Search
None
See application file for complete search history.

(56) References Cited

U.S. PATENT DOCUMENTS

2007/0195736 A1* 8/2007 Taira et al. ................. 370/335
2009/0080560 A1* 3/2009 Na et al. .................... 375/267

* cited by examiner

*Primary Examiner* — Jackie Zuniga Abad
(74) *Attorney, Agent, or Firm* — Garlick & Markison; Bruce E. Garlick

(57) ABSTRACT

A communication device includes a wireless transmitter, a wireless receiver, and a processing module. The wireless transmitter, the wireless receiver, and/or the processing module facilitate: a control-level communication with another communication device using initial transmit beamforming parameters and initial receive beamforming parameters; a handshake communication with the other communication device to determine adjustments of at least one of the initial transmit beamforming parameters and the initial receive beamforming parameters to produce at least one of adjusted transmit beamforming parameters and adjusted receive beamforming parameters; and a normal-level communication with the other communication device using the at least one of the adjusted transmit beamforming parameters and the adjusted receive beamforming parameters.

20 Claims, 8 Drawing Sheets

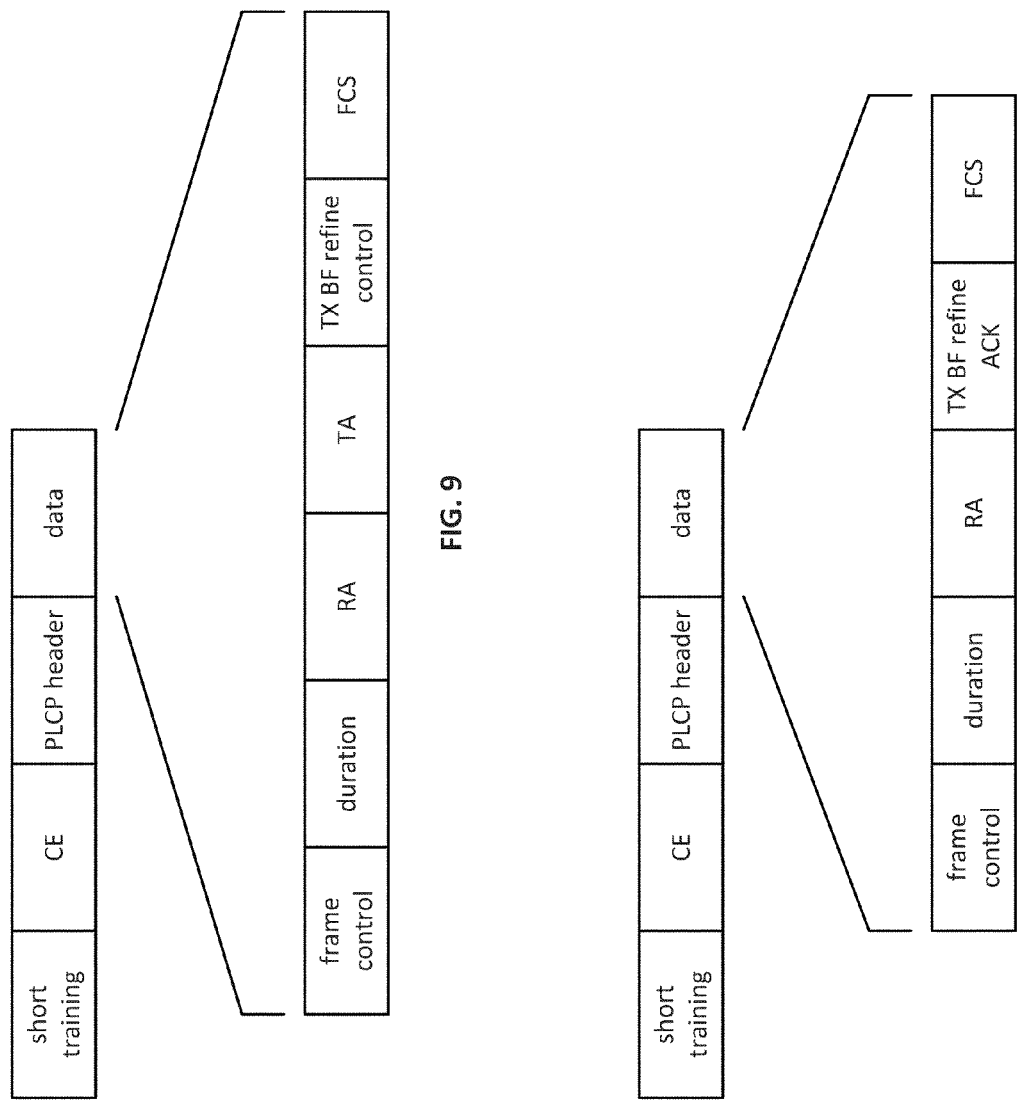

COMMUNICATION DEVICE INCORPORATING BEAMFORMING HANDSHAKING

This patent application is claiming priority under 35 USC §119 to a provisionally filed patent application entitled MMW TRANSCEIVER BEAMFORMING REFINEMENT, having a provisional filing date of Dec. 17, 2008, and a provisional Ser. No. 61/138,519.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to transmitters and/or receivers used in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11 b, or 802.11 g compliant or RFID standard compliant employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beamforming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data. As such, MIMO wireless communication offers the opportunity to transceive data at higher data rates than single input and/or single output wireless communications. However, when the signal strength of a MIMO wireless communication is weak, the data rate is reduced thereby negating the advantage of a MIMO system.

To provide a directional wireless communication (i.e., increase the signal strength by focusing the energy of a transmitted RF signal in a particular direction), transceivers may incorporate beamforming. In general, beamforming is a baseband and/or RF processing technique to create a focused antenna beam by shifting a signal in time or in phase to provide gain of the signal in a desired direction and to attenuate the signal in other directions.

In a known beamforming transmitter embodiment, the beamforming transmitter includes the data modulation stage, one or more intermediate frequency (IF) stages, the power amplifier, and a plurality of phase modules. The data modulation stage, the one or more IF stages and the power amplifier operate as discussed above to produce an amplified outbound RF signal. The plurality of phase modules adjust the phase of the amplified outbound RF signal in accordance with a beamforming matrix to produce a plurality of signals that are subsequently transmitted by a set of antennas.

Such a beamforming technique may be used to establish the initial setting for the beamforming matrix (i.e., establish the initial beamforming coefficients). In millimeter wave (MMW) communications (e.g., frequencies in the range of 3 GHz to 300 GHz), the initial beamforming setting may not be optimized. To attempt to overcome this, some MMW transceivers refine to the beamforming coefficients to optimize the beamforming angle. Currently, such techniques are rather cumbersome.

Therefore, a need exists for improved beamforming refinement in MMW transceivers.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 9 is a diagram of another example of a frame convention for refining beamforming in accordance with the present invention;

FIG. 10 is a diagram of another example of a frame convention for refining beamforming in accordance with the present invention;

DETAILED DESCRIPTION OF THE INVENTION

Figure 1:
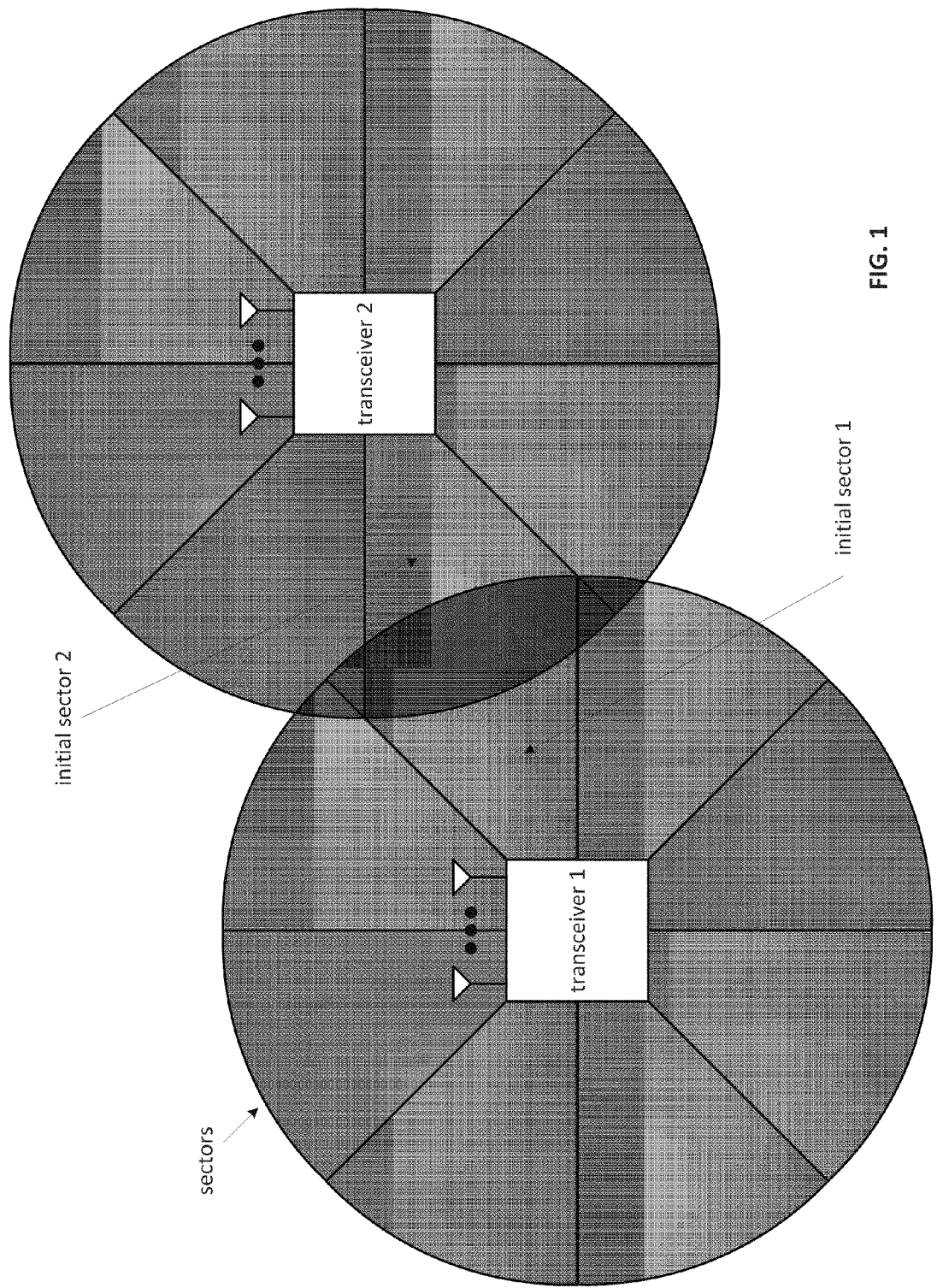
FIG. 1 is a schematic block diagram of an embodiment of two MMW transceivers in accordance with the present invention.

FIG. 1 is a schematic block diagram of an embodiment of two MMW transceivers (an embodiment of which will be described in greater detail with reference to FIG. 13) performing respective sweeping functions to determine initial sectors for each other's location. The number of sectors is dependent on the directional angle of the resulting beamformed pattern. For example, if the directional angle is 45 degrees (as shown in the example of FIG. 1), there will be 8 sectors. In another example, there may be 64 sectors.

To determine the initial sector, one transceiver is in a transmit mode and the other is in a receive mode. The transceiver that is in the transmit mode utilizing beamforming to establish a directional radiation pattern at a given beam angle (e.g., azimuth). The transceiver that is in the receive mode configures its receive antennas (if separate transmit and receive antennas are used) or its antennas (if the antennas are shared) for an omni directional radiation pattern.

In an example of operation, the transmissions from transceiver in the transmit mode to the transceiver in the receive mode may be done using control PHY (physical layer) frames. The transceiver in the transmit mode may use a sequence of transmit (TX) sections or beams (e.g., up to 64) using one or more control PHY frames per sector. Each of the PHY frames may includes a countdown timer to let the transceiver in the receive mode know when the sequence will end and when it will switch transmit/receive roles with the other transceiver. In addition, each PHY frame may include L-TX and L-RX parameters (e.g., the number of extra fields for transmit training fields and receive training fields, such as channel estimation fields) that will be used later for beam refinement.

Figure 2:
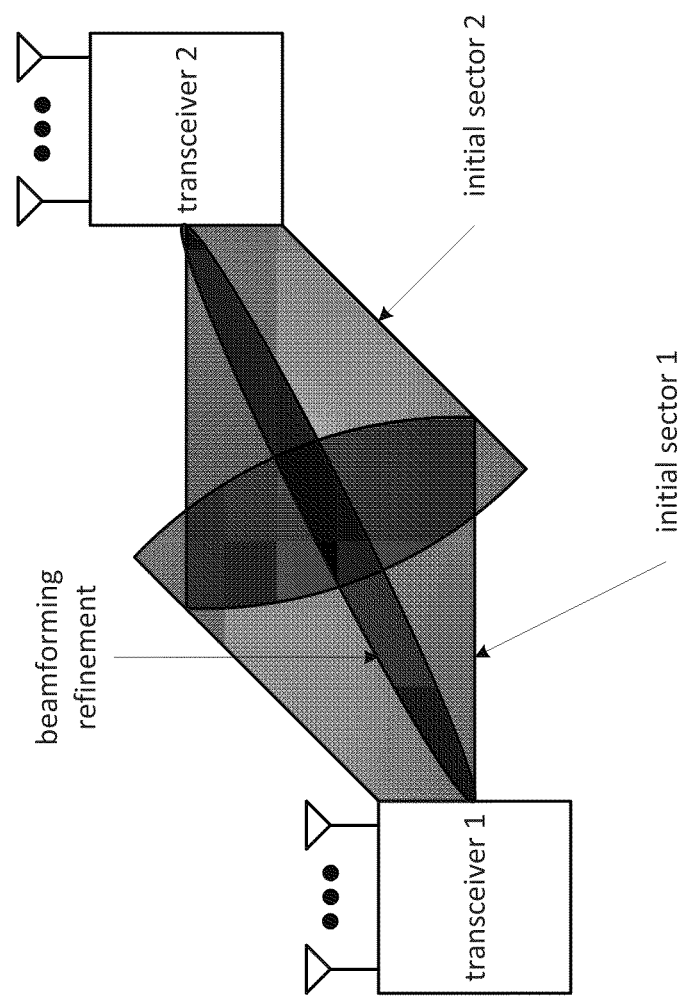
FIG. 2 is a schematic block diagram of an embodiment of two MMW transceivers refining beamforming therebetween in accordance with the present invention.

FIG. 2 is a schematic block diagram of an embodiment of two MMW transceivers refining beamforming therebetween. In this diagram, the transceivers have each identified their respective sectors (e.g., initial sector 1 for transceiver 1 and initial sector 2 for transceiver 2). Once the initial sectors, the transceivers refine the beamforming therebetween using one of a plurality of beamforming refining handshaking techniques, which is discussed with reference to FIGS. 3-12.

Figure 3:
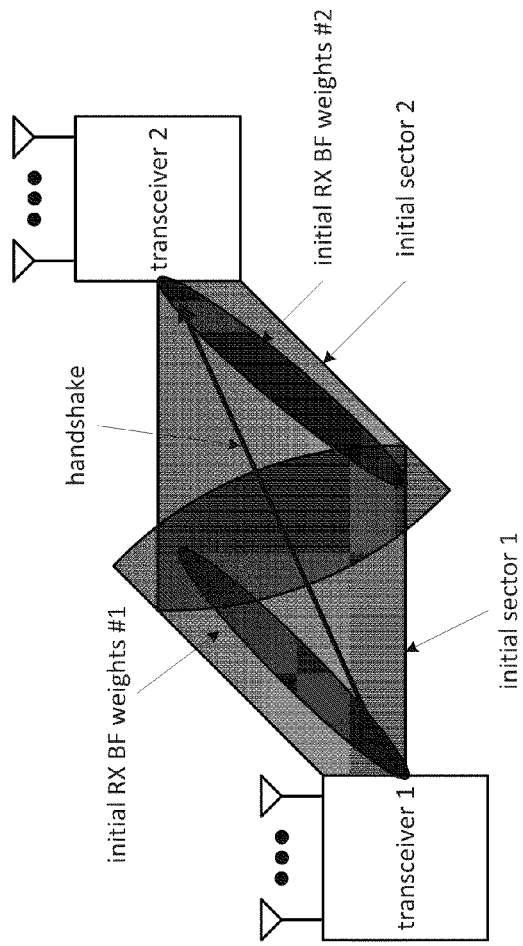
FIGS. 3 and 4 are schematic block diagrams of an example of two MMW transceivers refining beamforming therebetween in accordance with the present invention.
Figure 4:
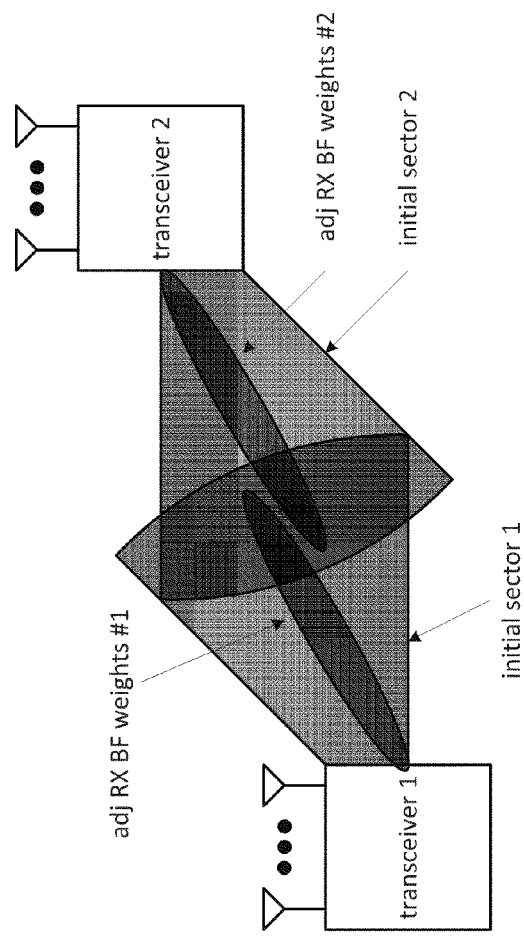

FIGS. 3 and 4 are schematic block diagrams of an example of two MMW transceivers refining receive beamforming parameters or coefficients therebetween. As shown in FIG. 3, each transceiver starts with initial receiver (RX) beamforming coefficients or weights (e.g., parameters). This establishes the receiver beamforming matrix for each transceiver. As shown, the initial RX beamforming weights may not produce the ideal or optimal beamforming angle therebetween but are sufficient for reliable control PHY communication. To achieve a more optimal beamforming angle, the transceivers use a handshaking technique to improve the beamforming weights. During the handshaking process, which may be done once or a plurality of times, the transceivers exchange their RX beamforming weights. From this exchange, the transceivers adjust their respective RX beam forming weights. This may be done in the control PHY frames (e.g., control level communication) or in the normal PHY frames (e.g., normal level communication). In this instance, no explicit refinement complete indication is needed.

FIG. 4 illustrates the transceivers having adjusted their RX beamforming weights after one or more handshaking sequences. In general, the transceivers use the handshaking data to better align their beamforming angle (e.g., azimuth) with each other. In this manner, a handshaking is simpler and easier to verify interoperability than a state machine, which requires changes to common frame formats. In addition, such a handshake protocol is the same for both initial refinement and tracking (periodic refinement) and is more robust. Further, failure of a handshake is verified instantly by FCS error or lack of response such that a transceiver can immediately try again, or fall back to control PHY. Still further, the handshake protocol is more flexible, allows a wider range of implementations, and allows the ability for some stations (i.e., transceivers) to initiate many handshakes, while others very few or none.

Figure 5:
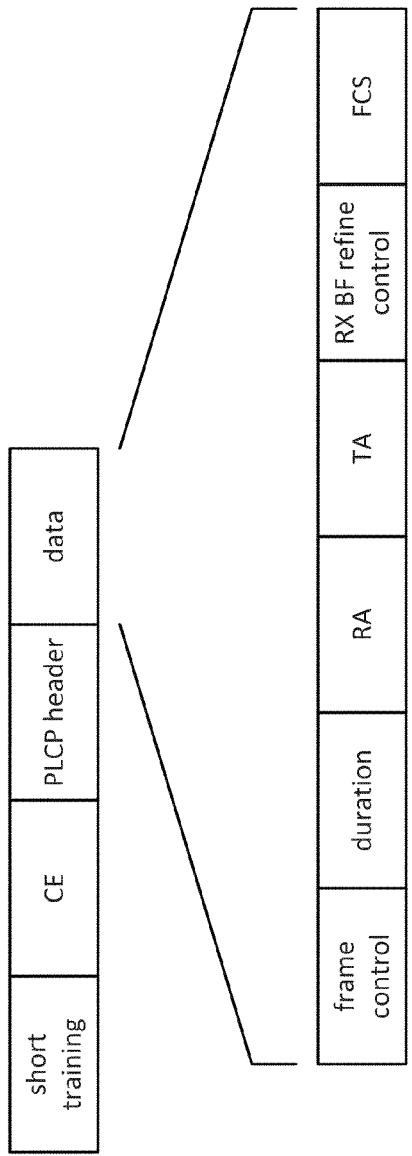
FIG. 5 is a diagram of an example of a frame convention for refining beamforming in accordance with the present invention.

FIG. 5 is a diagram of an example of a frame convention for refining beamforming. In this example, a two frame RX beamforming refinement handshake frame is used: One for a request and the other for a response exchange (e.g., similar to data—ack, with minimal interframe space between frames). In an example, the request frame for an RX beam refinement may be a standard PHY (e.g., normal level communication) or control PHY format (control level communication). In this manner, the framing protocol may resemble an 802.11 style Control Frame. Note that the RX Beam Refine Control field specifies the requested frame type (Control PHY or regular PHY) and specifies the number of training fields to be included in the response frame.

Figure 6:
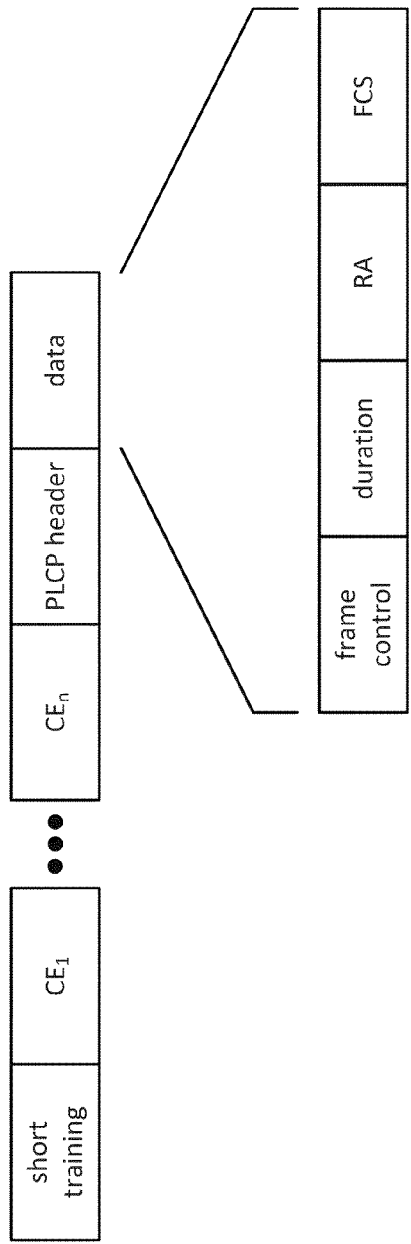
FIG. 6 is a diagram of another example of a frame convention for refining beamforming in accordance with the present invention.

FIG. 6 is a diagram of another example of a frame convention for refining beamforming. In this embodiment, a 2 frame RX Beam Refinement Handshake is illustrated. The RX Beam Refinement Response frame uses a Standard PHY or Control PHY format and further includes additional identical channel Estimation (CE) fields. In addition, a handshake initiator can make RX Antenna Weight Vector (AWV) adjustments using the additional CE fields. The payload follows an ACK frame format from 802.11, where CE1 has identical format to CE and $CE_2$-$CE_n$ may have additional length (cyclic prefix) to allow settling after antenna adjustments.

Figure 7:
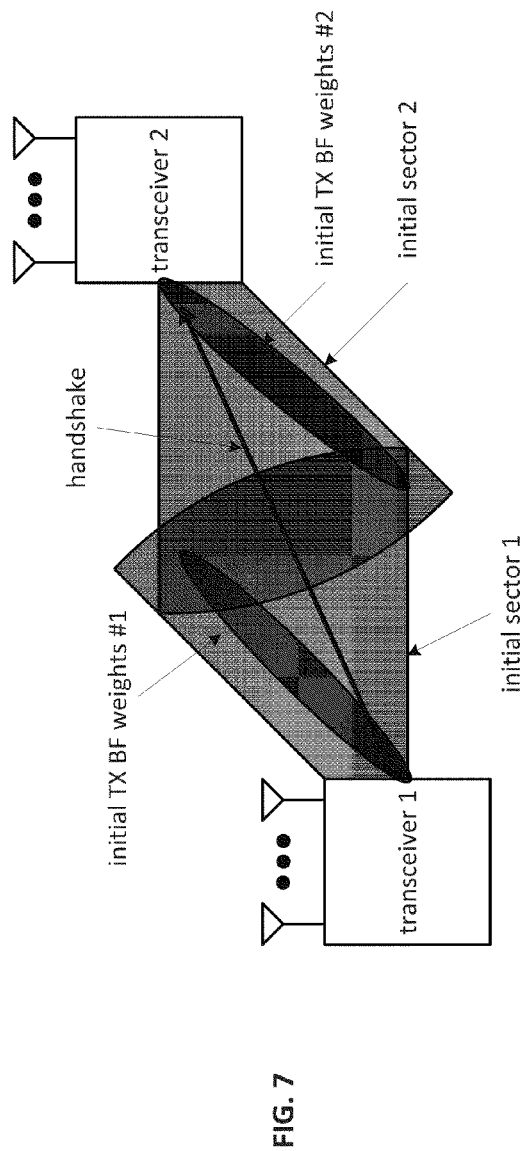
FIGS. 7 and 8 are schematic block diagrams of an example of two MMW transceivers refining beamforming therebetween in accordance with the present invention.
Figure 8:
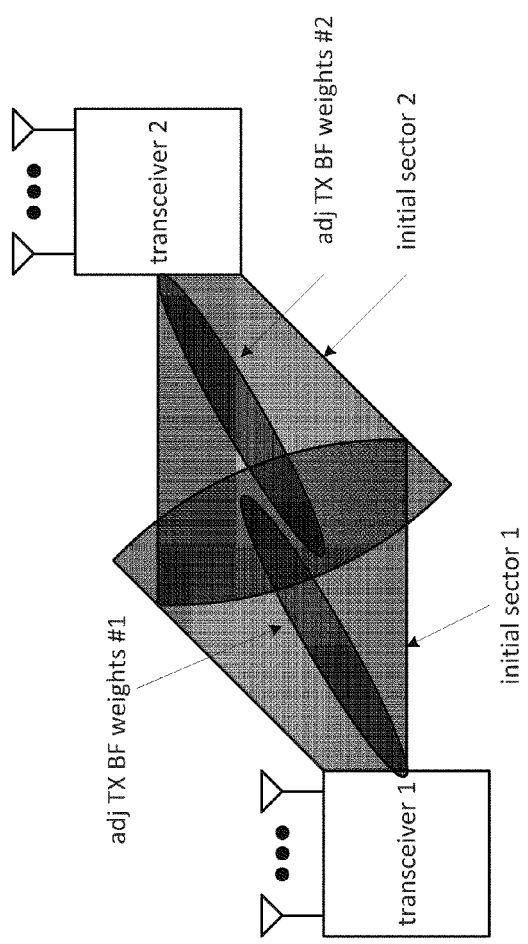

FIGS. 7 and 8 are schematic block diagrams of an example of two MMW transceivers refining beamforming therebetween. As shown in FIG. 7, each transceiver starts with initial transceiver (TX) beamforming coefficients or weights. This establishes the transceiver beamforming matrix for each transceiver. As shown, the initial TX beamforming weights may not produce the ideal or optimal beamforming angle therebetween, but are sufficient for reliable control PHY communication. To achieve a more optimal beamforming angle, the transceivers use a beamforming refinement handshaking technique to improve the beamforming weights.

One such refinement technique is a 4 frame TX Beam Refinement that includes a request for TX beam refinement frame, a clear for TX beam refinement frame, a TX beam refinement training frame, and a TX beam refinement response. The Request for TX Beam Refinement may be similar to an RTS frame, but further includes a number of transmit control frames. The Clear for TX Beam Refinement frame may be similar to CTS, which indicates its readiness for TX beam refinement. The TX Beam Refinement Training frame may be in accordance with a PHY Frame format and follows RX Beam Refinement Response frame. The TX Beam Refinement Response contains one or more best TX beamforming weights choice.

Another TX refinement technique uses a different control frame format. In addition to the four frames mentioned above, this technique includes an AWV (e.g., beamforming weights) encoding frame and CE fields. The AWV encoding frame may include a 6 bit index, which may only be required to be valid over a handshake. In addition, no index memory is required over previous handshakes and the methods for mapping antenna weights to AWV values are implementation dependent. The CE fields, when antenna weights (either TX or RX) are changed, provide the gain of the entire channel may change several dB. Additional settling time for the weight transitions and receiver gain adjustments will be needed. One method is to add a cyclic prefix to the head of the CE, fields for $i>1$ FIG. 8 illustrates the transceivers having adjusted their TX beamforming weights after one or more handshaking sequences. In general, the transceivers use the handshaking data to better align their beamforming angle (e.g., azimuth) with each other. In this manner, the refining techniques are simpler and easier to verify interoperability than a state machine, which requires changes to the common frame formats.

FIG. 9 is a diagram of another example of a frame convention for refining beamforming. In this diagram a request for TX beam refinement frame is shown. The frame may have a format similar to an 802.11 style Control Frame. In this frame, the TX Beam Refine Control field specifies request for frame type (regular or control PHY) and specifies request for the number of CE training fields.

FIG. 10 is a diagram of another example of a frame convention for refining beamforming. In this diagram, a clear for TX beam refinement frame is shown. The frame may have a format similar to an 802.11 style Control Frame (e.g., like CTS, but with additional TX Beam Refine Response). The TX Beam Refine Acknowledge field specifies frame type to be sent (regular or control PHY) and specifies number of training fields to be sent. Ordinarily, these are echoed back from request. Request may be modified if receiving station requires fewer frames or control PHY is needed.

Figure 11:
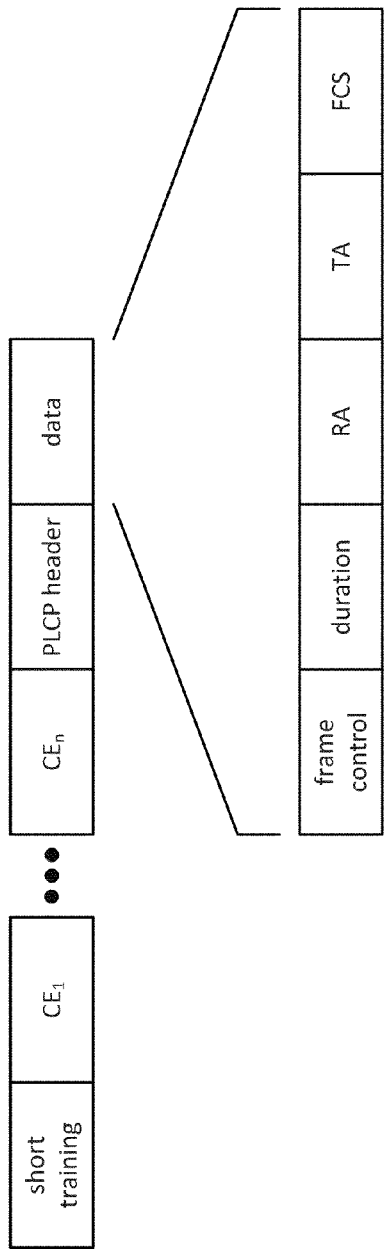
FIG. 11 is a diagram of another example of a frame convention for refining beamforming in accordance with the present invention.

FIG. 11 is a diagram of another example of a frame convention for refining beamforming. In this diagram, a TX beam refinement training frame is shown. The frame may have a format that includes a Short training field, $CH_i$ field, PLCP Header field, and Data field that are all sent with the same TX AWV. The $CE_2$-$CE_n$ fields are sent with alternate TX AWVs, where $CE_1$ has identical format to CE and $CE_2$-$CE_n$ may have additional length to allow settling after antenna adjustments.

Figure 12:
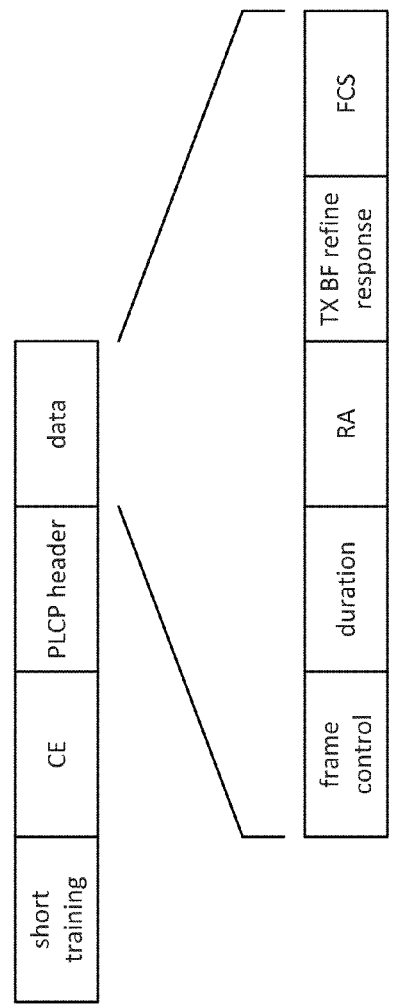
FIG. 12 is a diagram of another example of a frame convention for refining beamforming in accordance with the present invention.

FIG. 12 is a diagram of another example of a frame convention for refining beamforming. In this diagram, a TX beam refinement response frame is shown. The frame has a format as shown and follows the ACK. The TX Beam Refine Response field specifies which $CE_i$ had the best received signal, or the desired signal.

Figure 13:
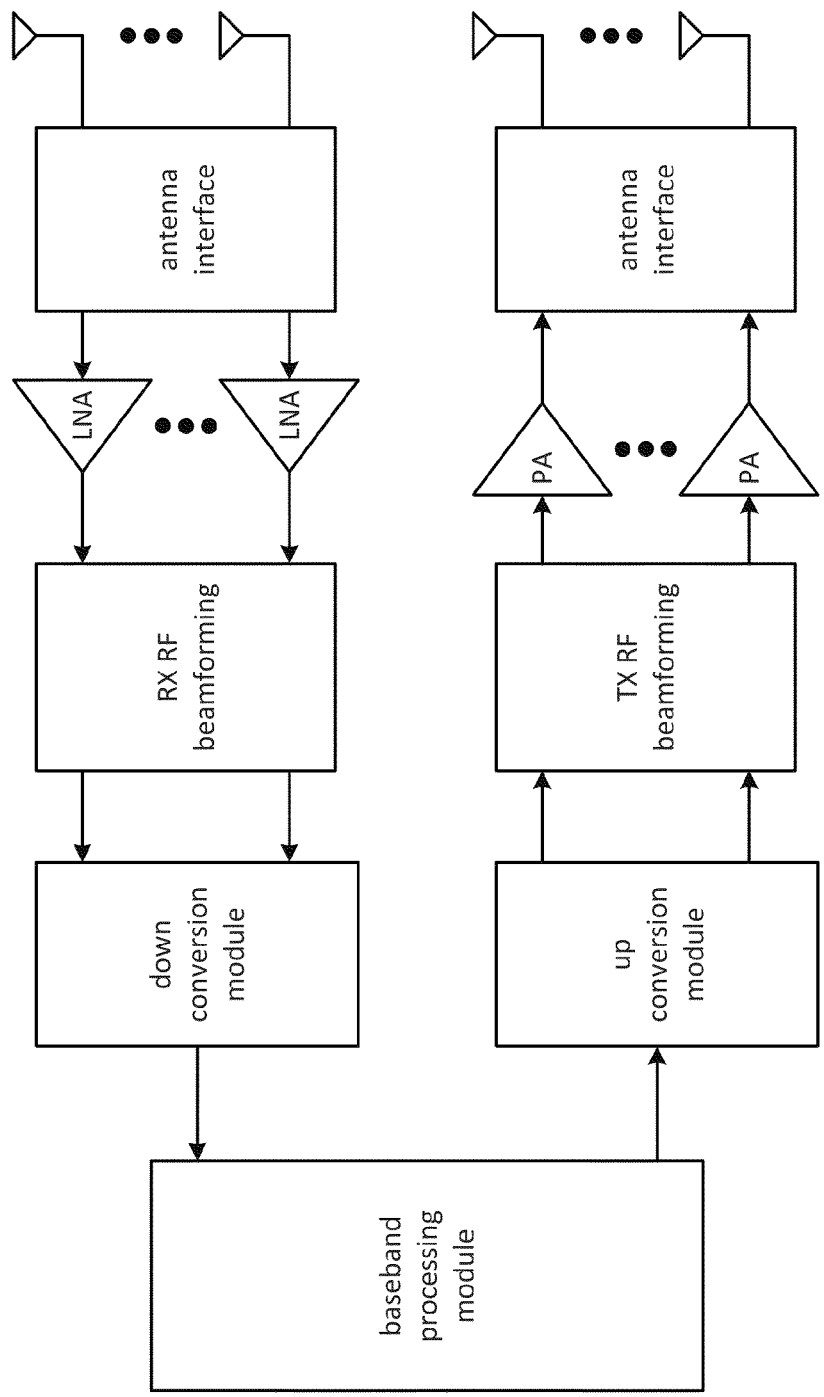
FIG. 13 is a schematic block diagram of an embodiment of a MMW transceiver in accordance with the present invention.

FIG. 13 is a schematic block diagram of an embodiment of a MMW transceiver that includes receiver section, a transmitter section, and a baseband processing module. The receiver section includes an antenna interface (e.g., a transmission line, an impedance matching circuit, and/or a transformer balun), an RX RF beamforming section, a plurality of low noise amplifiers (LNA), and a down conversion module. The transmitter section includes an up conversion module, a plurality of power amplifiers (PA), a TX RF beamforming section, and an antenna interface (e.g., a transmission line, an impedance matching circuit, and/or a transformer balun). In this example, the receiver section and transmitter section are coupled to a separate set of antennas. In an alternate embodiment, the transmitter and receiver sections may share a set of antennas.

The baseband processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-13.

In operation, the receiver antennas receive an inbound RF signal and provide their received versions of the signal to the RX beamforming section via the antenna interface and the LNAs. The RX beamforming section, via the RX beamforming weights, produces a plurality of RX beamformed signals. The down conversion module converts the amplified RX beamformed signals into one or more inbound symbol streams. In an embodiment, the down conversion module mixes in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., $+/-\Delta\theta$ [phase shift] and/or $\theta(t)$ [phase modulation]) and/or frequency information (e.g., $+/-\Delta f$ [frequency shift] and/or $f(t)$ [frequency modulation]). In another embodiment and/or in furtherance of the preceding embodiment, the inbound RF signal includes amplitude information (e.g., $+/-\Delta A$ [amplitude shift] and/or $A(t)$ [amplitude modulation]). To recover the amplitude information, the receiver section includes an amplitude detector such as an envelope detector, a low pass filter, etc.

The baseband processing module converts the inbound symbol stream(s) into inbound data (e.g., voice, text, audio, video, graphics, etc.) in accordance with an appropriate MMW standard. Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

For outgoing data, the baseband processing converts outbound data into one or more outbound symbol streams in accordance with the appropriate MMW standard. Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the processing module may generate the RX and TX beamforming coefficients (or weights).

The transmitter section converts the outbound symbol stream into an outbound RF signal that has a carrier frequency within a given frequency band (e.g., 57-66 GHz, etc.). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., $+/-\Delta\theta$ [phase shift] and/or $\theta(t)$ [phase modulation]) that adjusts the phase of the oscillation to produce a phase adjusted RF signal, which is transmitted as the outbound RF signal. In another embodiment, the outbound symbol stream includes amplitude information (e.g., $A(t)$ [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., $+/-\Delta f$ [frequency shift] and/or $f(t)$ [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., $+/-\Delta A$ [amplitude shift] and/or $A(t)$ [amplitude modulation) that adjusts the amplitude of the oscillation to produce the outbound RF signal.

The TX RF beamforming section converts the outbound RF signal into a plurality of outbound BF signals in accordance with the TX beamforming weights. The antenna interface provides the outbound BF signals to the antennas for transmission.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. communication device comprises:
   a wireless transmitter;
   a wireless receiver; and
   a processing module operably coupled to the wireless transmitter and the wireless receiver, wherein at least one of the wireless transmitter, the wireless receiver, and the processing module is operably coupled to facilitate:
   a control-level communication with another communication device using initial transmit beamforming parameters and initial receive beamforming parameters;
   a handshake communication with the other communication device to support receipt of receive beamforming weights of the other communication device;
   adjustment of the initial receive beamforming parameters based upon the receive beamforming weights of the other communication device to produce adjusted receive beamforming parameters; and
   a normal-level communication with the other communication device using the adjusted receive beamforming parameters;
   wherein the control-level communication comprises:
   the processing module generating a series of transmit control frames;
   the wireless transmitter:
   converting the series of transmit control frames into a series of outbound wireless signals; and
   sequentially transmitting the series of outbound wireless signals in different sectors of a transmission radiation pattern that is based on the initial transmit beamforming parameters;
   the wireless receiver:
   receiving one or more inbound wireless signals in accordance with a reception radiation pattern that is based on the initial receive beamforming parameters, wherein an inbound wireless signal of the one or more inbound wireless signals corresponds to an outbound wireless signal of the series of outbound wireless signals; and
   converting the one or more inbound wireless signals into one or more inbound symbol streams; and
   the processing module:
   converting the one or more inbound symbol streams into one or more control response signals; and
   interpreting the one or more control response signals to identify a sector of the sectors of the transmission radiation pattern.

2. The communication device of claim 1, wherein a control frame of the series of transmit control frames comprises:
   source information;
   a timer count indication; and
   transmit beamforming information regarding a corresponding sector of the sectors of the transmission radiation pattern.

3. The communication device of claim 1, wherein the control-level communication comprises:
   the wireless receiver of the communication device:
   receiving one or more of a series of inbound wireless signals in accordance with a reception radiation pattern that is based on the initial receive beamforming parameters; and
   converting the one or more of the series of inbound wireless signals into one or more inbound symbol streams;
   the processing module of the communication device generating one or more response signals corresponding to the one or more of the series of inbound wireless signals;
   the wireless transmitter of the communication device:
   converting the one or more response signals into one or more outbound wireless signals; and
   transmitting the one or more outbound wireless signals based on the initial transmit beamforming parameters.

4. The communication device of claim 1, wherein the handshake communication comprises:
- the processing module of the communication device generating a request frame that includes a receive beamforming refine control field;
- the wireless transmitter of the communication device:
  - converting the request frame into an outbound wireless signal; and
  - transmitting the outbound wireless signal;
- the wireless receiver of the communication device:
  - receiving an inbound wireless signal; and
  - converting the inbound wireless signal into a response frame that identifies the other communication device and an acknowledgement; and
- the processing module processing the response frame to determine the adjustment of the initial receive beamforming parameters to produce the adjusted receive beamforming parameters.

5. The communication device of claim 1, wherein the handshake communication comprises:
- the processing module of the communication device generating a request frame that includes a plurality of Channel Estimation (CE) fields, wherein each CE field corresponds to a different set of the receive beamforming parameters;
- the wireless transmitter of the communication device:
  - converting the request frame into an outbound wireless signal; and
  - transmitting the outbound wireless signal;
- the wireless receiver of the communication device:
  - receiving an inbound wireless signal; and
  - converting the inbound wireless signal into a response frame that identifies at least one of the plurality of CE fields as having a favorable beamforming setting; and
- the processing module processing the response frame to determine the adjustment of the initial receive beamforming parameters to produce the adjusted receive beamforming parameters.

6. The communication device of claim 1, wherein the handshake communication comprises:
- the processing module of the communication device generating a request frame that includes a transmit beamforming refine request field;
- the wireless transmitter of the communication device:
  - converting the request frame into an outbound wireless signal; and
  - transmitting the outbound wireless signal;
- the wireless receiver of the communication device:
  - receiving an inbound wireless signal; and
  - converting the inbound wireless signal into a response frame that includes a transmit beamforming refine acknowledgement field and identity of the other communication device; and
- the processing module processing the response frame to determine adjustments to the initial transmit beamforming parameters to produce adjusted transmit beamforming parameters.

7. The communication device of claim 1, wherein the handshake communication comprises:
- the processing module of the communication device generating a request frame that includes a plurality of Channel Estimation (CE) fields, wherein each CE field corresponds to a different set of the transmit beamforming parameters;
- the wireless transmitter of the communication device:
  - converting the request frame into an outbound wireless signal; and
  - transmitting the outbound wireless signal;
- the wireless receiver of the communication device:
  - receiving an inbound wireless signal; and
  - converting the inbound wireless signal into a response frame that identifies at least one of the plurality of CE fields as having a favorable beamforming setting; and
- the processing module processing the response frame to determine adjustments to the initial transmit beamforming parameters to produce adjusted transmit beamforming parameters.

8. The communication device of claim 1, wherein the handshake communication comprises:
- a control level communication; or
- a normal level communication.

9. A communication device comprises:
- a wireless transmitter;
- a wireless receiver; and
- a processing module operably coupled to the wireless transmitter and the wireless receiver, wherein at least one of the wireless transmitter, the wireless receiver, and the processing module is operably coupled to facilitate:
  - transmission of a plurality of control-level wireless signals in different sectors of a transmission radiation pattern based on initial transmit beamforming parameters;
  - a determination of whether a response wireless signal is received, via the wireless receiver, regarding at least one of the plurality of control-level wireless signals from another communication device;
  - interpreting the response wireless signal to identify a sector of the transmission radiation pattern;
  - when the response wireless signal is received:
  - a handshake communication with the other communication device to support receipt of receive beamforming weights of the other communication device;
  - adjustment of initial receive beamforming parameters of the wireless receiver based upon the receive beamforming weights of the other communication device to produce adjusted receive beamforming parameters; and
  - a normal-level communication with the other communication device using the adjusted receive beamforming parameters.

10. The communication device of claim 9, wherein the handshake communication comprises:
- the processing module of the communication device generating a request frame that includes a receive beamforming refine control field;
- the wireless transmitter of the communication device:
  - converting the request frame into an outbound wireless signal; and
  - transmitting the outbound wireless signal;
- the wireless receiver of the communication device:
  - receiving an inbound wireless signal; and
  - converting the inbound wireless signal into a response frame that identifies the other communication device and an acknowledgement; and
- the processing module processing the response frame to determine the adjustment of the initial receive beamforming parameters to produce the adjusted receive beamforming parameters.

11. The communication device of claim 9, wherein the handshake communication comprises:
- the processing module of the communication device generating a request frame that includes a plurality of Channel Estimation (CE) fields, wherein each CE field corresponds to a different set of the receive beamforming parameters;

the wireless transmitter of the communication device:
   converting the request frame into an outbound wireless signal; and
   transmitting the outbound wireless signal;
the wireless receiver of the communication device:
   receiving an inbound wireless signal; and
   converting the inbound wireless signal into a response frame that identifies at least one of the plurality of CE fields as having a favorable beamforming setting; and
the processing module processing the response frame to determine the adjustment of the initial receive beamforming parameters to produce the adjusted receive beamforming parameters.

12. The communication device of claim 9, wherein the handshake communication comprises:
   the processing module of the communication device generating a request frame that includes a transmit beamforming refine request field;
   the wireless transmitter of the communication device:
      converting the request frame into an outbound wireless signal; and
      transmitting the outbound wireless signal;
   the wireless receiver of the communication device:
      receiving an inbound wireless signal; and
      converting the inbound wireless signal into a response frame that includes a transmit beamforming refine acknowledgement field and identity of the other communication device; and
   the processing module processing the response frame to determine adjustments to the initial transmit beamforming parameters to produce adjusted transmit beamforming parameters.

13. The communication device of claim 9, wherein the handshake communication comprises:
   the processing module of the communication device generating a request frame that includes a plurality of Channel Estimation (CE) fields, wherein each CE field corresponds to a different set of the transmit beamforming parameters;
   the wireless transmitter of the communication device:
      converting the request frame into an outbound wireless signal; and
      transmitting the outbound wireless signal;
   the wireless receiver of the communication device:
      receiving an inbound wireless signal; and
      converting the inbound wireless signal into a response frame that identifies at least one of the plurality of CE fields as having a favorable beamforming setting; and
   the processing module processing the response frame to determine adjustments to the initial transmit beamforming parameters to produce adjusted transmit beamforming parameters.

14. The communication device of claim 9, wherein the handshake communication comprises:
   a control level communication; or
   a normal level communication.

15. A communication device comprises:
   a wireless transmitter;
   a wireless receiver; and
   a processing module operably coupled to the wireless transmitter and the wireless receiver, wherein at least one of the wireless transmitter, the wireless receiver, and the processing module is configured to facilitate a beamforming adjustment handshake operation that includes:
      the wireless transmitter transmitting a plurality of control-level wireless signals in different sectors of a transmission radiation pattern;
      the wireless receiver receiving a response wireless signal regarding at least one of the plurality of control-level wireless signals from another communication device;
      the processing module generating a request frame that includes a beamforming refine control field;
      the wireless transmitter:
         converting the request frame into an outbound wireless signal; and
         transmitting the outbound wireless signal to the other communication device;
      the wireless receiver:
         receiving an inbound wireless signal from the other communication device; and
         converting the inbound wireless signal into a response frame that identifies the other communication device and a response message that includes receive beamforming weights of the other communication device; and
      the processing module processing the response frame to determine adjustments of receive beamforming parameters of the wireless receiver based upon the receive beamforming weights of the other communication device.

16. The communication device of claim 15 further comprises:
   the processing module generating the request frame to include a receive beamforming refine control field; and
   the processing module processing the response frame to determine the adjustments of the receive beamforming parameters of the wireless receiver.

17. The communication device of claim 15 further comprises:
   the processing module generating the request frame to include a plurality of Channel Estimation (CE) fields, wherein each CE field corresponds to a different set of receive beamforming parameters; and
   the processing module processing the response frame to determine the adjustments of the receive beamforming parameters of the wireless receiver.

18. The communication device of claim 15 further comprises:
   the processing module generating the request frame to include a transmit beamforming refine request field; and
   the processing module processing the response frame to determine adjustments of transmit beamforming parameters of the wireless transmitter.

19. The communication device of claim 15 further comprises:
   the processing module generating the request frame that includes a plurality of Channel Estimation (CE) fields, wherein each CE field corresponds to a different set of transmit beamforming parameters of the wireless transmitter; and
   the processing module processing the response frame to determine adjustments to transmit beamforming parameters utilized by the wireless transmitter.

20. The communication device of claim 15 further comprises:
   transceiving the inbound and outbound wireless signals in accordance with a control level communication protocol; or
   transceiving the inbound and outbound wireless signals in accordance with a normal level communication protocol.

* * * * *